(12) United States Patent
DeLellis et al.

(10) Patent No.: US 7,618,094 B2
(45) Date of Patent: Nov. 17, 2009

(54) REPOSITIONABLE SEAT ASSEMBLY FOR A VEHICLE AND A METHOD OF OPERATING THE SAME

(75) Inventors: Louis D DeLellis, South Lyon, MI (US); John E Schambre, Canton, MI (US); Lloyd G Montford, Novi, MI (US); Jeffery E Long, Canton, MI (US); Leonard C Paul, Jr., Dearborn Heights, MI (US); Michael O Forker, Novi, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 718 days.

(21) Appl. No.: 10/999,458

(22) Filed: Nov. 30, 2004

(65) Prior Publication Data

US 2006/0138838 A1 Jun. 29, 2006

(51) Int. Cl.
*A47C 1/00* (2006.01)
*B60N 2/02* (2006.01)
(52) U.S. Cl. ................ 297/331; 297/13; 297/376; 297/337
(58) Field of Classification Search ............... 297/14, 297/331–336, 256.12, 13, 376; 296/65.01, 296/65.13, 65.05
See application file for complete search history.

(56) References Cited

U.S. PATENT DOCUMENTS

| | | | | |
|---|---|---|---|---|
| 6,070,939 A * | 6/2000 | Matsuo et al. | ......... | 297/378.12 |
| 6,106,066 A * | 8/2000 | Moffa et al. | ................ | 297/332 |
| 6,155,639 A * | 12/2000 | Frolo | ......................... | 297/331 |
| 6,170,913 B1 * | 1/2001 | Seibold et al. | .............. | 297/335 |
| 6,183,033 B1 * | 2/2001 | Arai et al. | ................ | 296/65.09 |
| 6,523,899 B1 * | 2/2003 | Tame | ......................... | 297/331 |
| 6,595,587 B2 * | 7/2003 | Konishi et al. | .............. | 297/331 |
| 6,676,216 B1 * | 1/2004 | Freijy et al. | ................. | 297/335 |
| 6,685,269 B1 * | 2/2004 | Freijy et al. | ................. | 297/332 |
| 6,695,378 B2 * | 2/2004 | Hanagan | .................. | 296/65.01 |
| 6,805,407 B2 * | 10/2004 | Iliscu | ......................... | 297/331 |
| 6,886,878 B2 * | 5/2005 | Schambre et al. | ......... | 296/65.09 |

* cited by examiner

*Primary Examiner*—David Dunn
*Assistant Examiner*—Erika Garrett
(74) *Attorney, Agent, or Firm*—Ralph E. Smith

(57) ABSTRACT

A seat assembly includes a frame operably attached to a vehicle. A seat bottom is operably attached to the frame. The seat bottom is repositionable between a seating position and a stowed position. A seat back is operably attached to the frame. The seat back is repositionable between a seating position and a stowed position. The seat back rotates about a longitudinal axis during repositioning of the seat back between the seating and the stowed positions. A method of repositioning the seat assemblies includes repositioning a seat bottom between a seating position and a stowed position, and repositioning a seat back between a seating position and a stowed position about a longitudinal axis. Another seat assembly includes a seat bottom operably attached to the frame with at least one pivoting link and at least one sliding link. The seat bottom is repositionable between a seating position and an elevated position.

16 Claims, 11 Drawing Sheets

REPOSITIONABLE SEAT ASSEMBLY FOR A VEHICLE AND A METHOD OF OPERATING THE SAME

TECHNICAL FIELD OF THE INVENTION

The present invention relates generally to seat assemblies for a vehicle. More particularly, the invention relates to a repositionable seat assembly and a method of operating the same.

BACKGROUND OF THE INVENTION

Numerous vehicles, such as automobiles, include a second and sometimes a third row of seats positioned rearward of the driver seat and the front passenger seat. In the case of contemporary minivans, as well as so-called sports utility vehicles, such vehicles may include a sliding side door allowing access of passengers to the second and third row of seats. In such instances, one or more seats of the second row may be folded and/or slid forward to further facilitate ingress and egress of passengers to and from the third row of seats. Oftentimes the movement of the second row of seat(s) in this manner does not provide sufficient ease of access. For example, a substantial portion of the second row seat may still remain in the pathway between the passenger and the exit even after it is folded and slid forward. Therefore, it would be desirable to provide a strategy for repositioning a seat assembly, such as a second row seat, which would facilitate access into and out of the vehicle.

For some vehicles, it is desirable to provide rearward seating for larger sized children. So called "booster seats" are typically installed separately on top of existing rear seats and then secured thereto with, for example, a seatbelt. The installation of such seats may be difficult and time-consuming as the seats may be large, heavy, and require attachment step(s). In addition, the booster seats must be repeatedly removed and re-installed between uses of an adult and the child. Therefore, it would be desirable to provide a strategy for providing a strategy for elevating a seat that does not require separate, difficult, and time-consuming installation steps.

Therefore, it would be desirable to provide a repositionable seat assembly and a method of operating the same that overcomes the aforementioned and other disadvantages.

SUMMARY OF THE INVENTION

One aspect of the present invention provides a seat assembly for a vehicle. The assembly includes a frame operably attached to the vehicle. A seat bottom is operably attached to the frame. The seat bottom is repositionable between a seating position and a stowed position. A seat back is operably attached to the frame. The seat back is repositionable between a seating position and a stowed position. The seat back rotates about a longitudinal axis during repositioning of the seat back between the seating position and the stowed position.

Another aspect of the invention provides a method of operating a seat assembly for a vehicle. The method includes repositioning a seat bottom from a seating position to a stowed position, and repositioning a seat back from a seating position to a stowed position about a longitudinal axis.

Another aspect of the invention provides a seat assembly for a vehicle. The assembly includes means for repositioning a seat bottom between a seating position and a stowed position, and means for repositioning a seat back between a seating position and a stowed position about a longitudinal axis. The assembly further includes means for locking at least one of the seat bottom and the seat back, and means for releasing at least one of the locked seat bottom and the locked seat back.

Another aspect of the invention provides a seat assembly for a vehicle. The assembly includes a frame operably attached to the vehicle. A seat bottom is operably attached to the frame with at least one pivoting link and at least one sliding link. A seat back is operably attached to the frame. The seat bottom is repositionable between a seating position and an elevated position. The sliding link provides repositioning of the seat bottom between the seating position and the elevated position substantially along a vertical axis.

Another aspect of the invention provides a method of operating a seat assembly for a vehicle. The method includes releasing and locking a seat bottom of the seat assembly. The seat bottom is repositioned substantially along a vertical axis between a seated position and an elevated position. The repositioning comprises pivoting and sliding of the seat bottom.

The foregoing and other features and advantages of the invention will become further apparent from the following detailed description of the presently preferred embodiments, read in conjunction with the accompanying drawings. The detailed description and drawings are merely illustrative of the invention, rather than limiting the scope of the invention being defined by the appended claims and equivalents thereof.

DETAILED DESCRIPTION OF THE PRESENTLY PREFERRED EMBODIMENTS

Figure 1A:
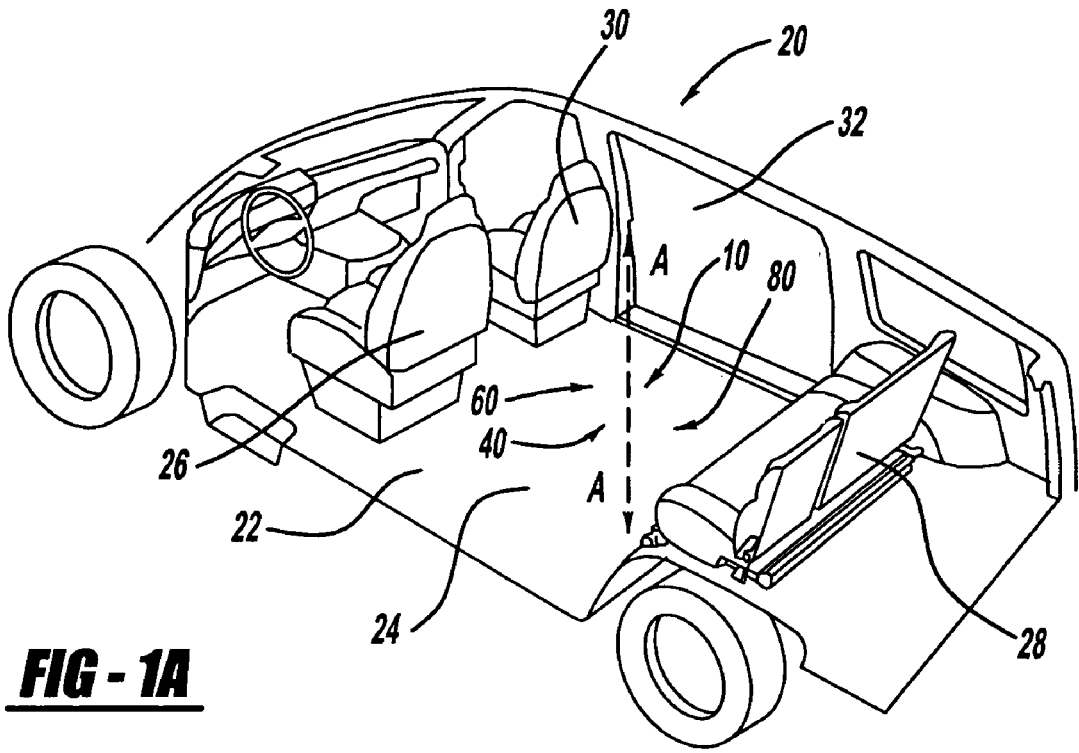
FIGS. 1A and 1B are two views illustrating sequential repositioning of a seat assembly for a vehicle, shown in accordance with one embodiment of the present invention.
Figure 1B:
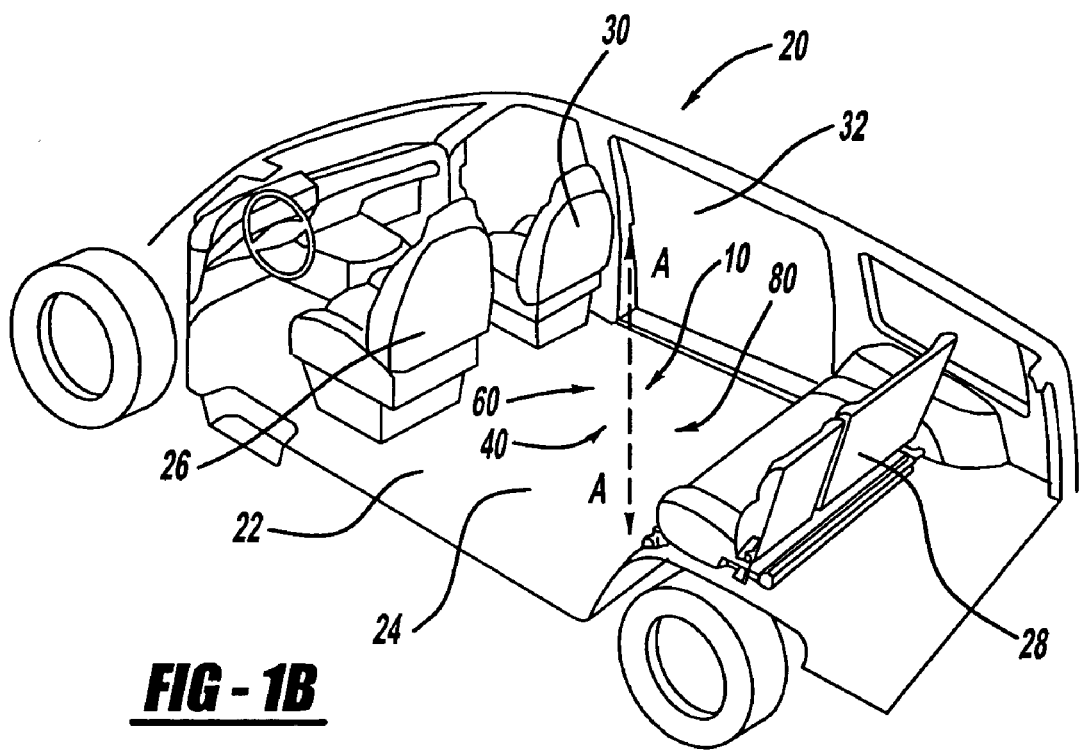

Referring to the drawings, wherein like reference numerals refer to like elements, FIGS. 1A and 1B are two views illustrating sequential repositioning of a seat assembly 10 for a vehicle 20, made in accordance with one embodiment of the present invention. Seat assembly 10 includes a frame 40 operably attached to the vehicle 20 at, in this case, a vehicle floor 22. A seat bottom 60 and a seat back 80 are operably attached to the frame 40. The seat bottom 60 and seat back 80 are repositionable between a seating position, shown in FIG. 1A, and a stowed position, shown in FIG. 1B. The seat back 80 rotates about a longitudinal axis A during repositioning of the seat back 80 between the seating position and the stowed position. The longitudinal axis A extends substantially orthogonally to the vehicle floor 22. A second row seat 24 may be positioned behind a front driver seat 26 and beside the seat assembly 10. A third row of seats 28 may be positioned behind the seat assembly 10 and the second row seat 24. Seat assembly 10 may be positioned behind a front passenger seat 30 and adjacent an opening for a sliding door 32. Seat assembly 10 facilitates entrance and exit of passengers, cargo, and the like into and out of the vehicle 20 between, for example, the sliding door 32 and the third row of seats 28.

The type of the vehicle 20 may vary and include numerous automobiles, marine vessels, aircraft, and the like. Vehicle 20 shown is as an automobile, specifically a minivan. Those skilled in the art will recognize that the configuration of the seats within the vehicle 20 may also vary and is not limited to the embodiment provided. For example, the second row seat 24 may be replaced with another seat assembly of the present invention, which would facilitate vehicle access should a sliding door be positioned behind the front driver seat 26. Further, the second row seat 24 and/or seat assembly 10 may comprise a variety of split seat designs, such as the 60-40 and 40-20-40 split designs. The inventors contemplate numerous vehicle types and seat configuration that fall within the scope of the present invention.

Figure 2:
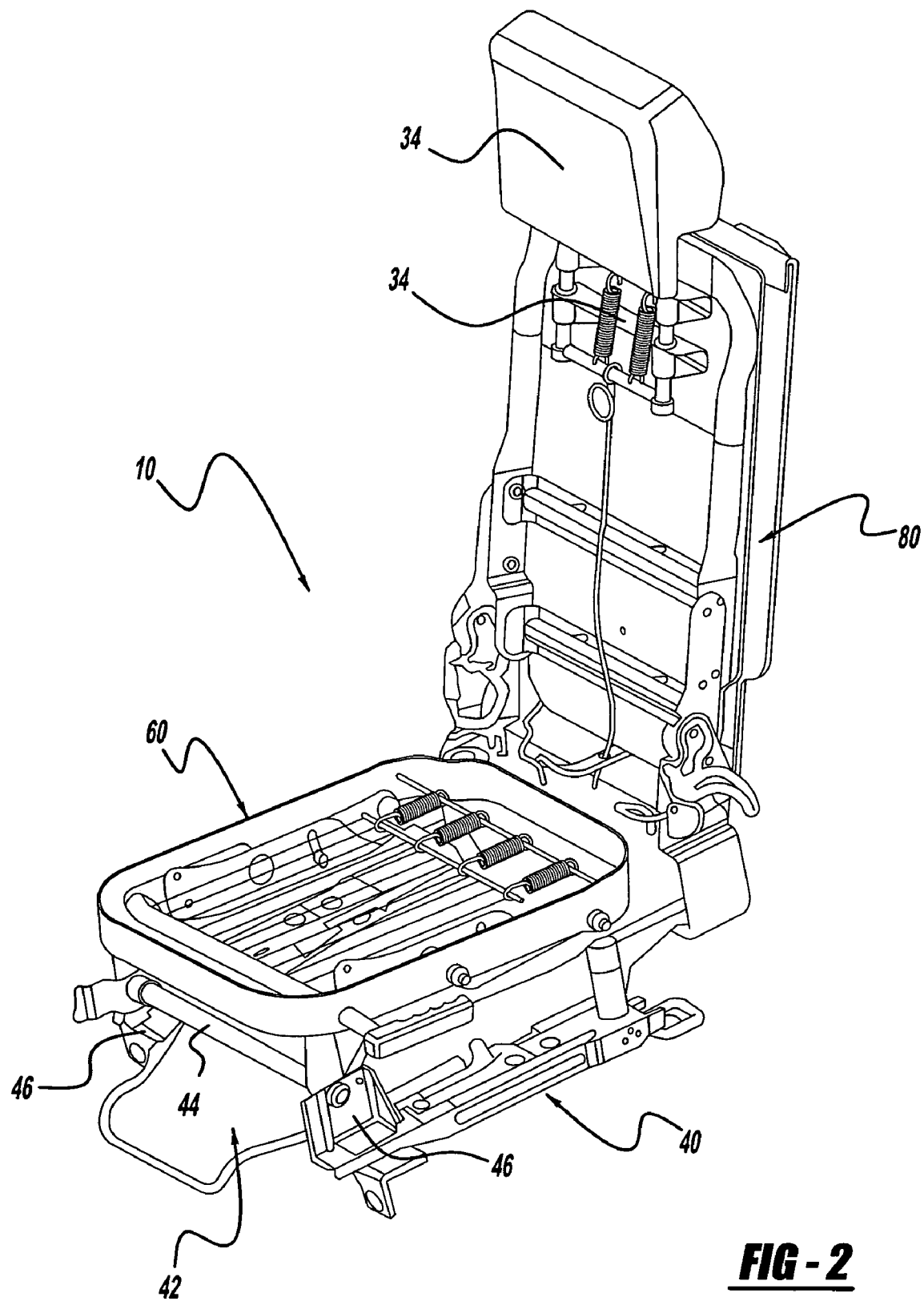
FIG. 2 is a perspective view of the seat assembly shown in FIG. 1A shown with a seat bottom and seat back in a seated position, in accordance with one embodiment of the present invention.
Figure 3:
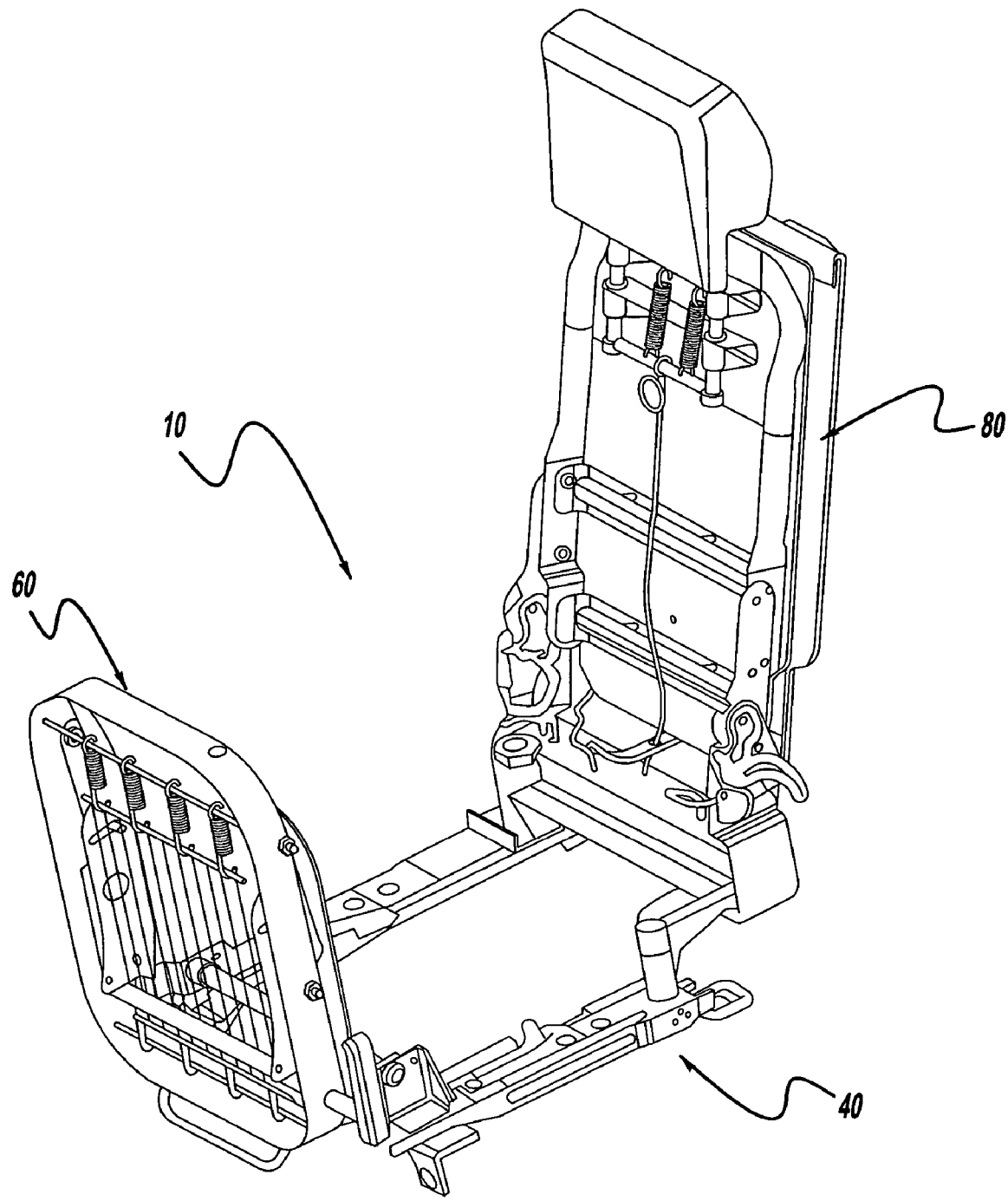
FIG. 3 is a perspective view of the seat assembly of FIG. 2 shown with the seat bottom in a stowed position, and the seat back in the seated position, in accordance with one embodiment of the present invention.

Referring now to FIG. 2, the seat assembly 10 is shown in the seating position. Seat assembly 10 may include an adjustable headrest 34, which may be adjusted in vertical and horizontal directions. In one embodiment, the seat bottom 60 may be operably attached to the frame 40 with at least one, in this case one, hinge assembly 42. Hinge assembly 42 may comprise a bar member 44 positioned through two flange portions 46 of the frame 40. Hinge assembly 42 provides a swinging motion of the seat bottom 60 in a foreword direction between the seated position and the stowed position, the latter position is shown in FIG. 3.

In another embodiment, the seat bottom 60 may be operably attached to the frame 40 at other position(s). For example, the frame 40 may be operably attached to another portion of vehicle 20 in addition to or instead of the vehicle floor 22, such as to the second row seat 24 or a vehicle sidewall. Seat bottom 60 may be stowed in a direction in addition to or in lieu of the forward direction. For example, the hinge assembly 42 may be reconfigured to allow the seat bottom 60 to be stowed down, sideways, at an angle, and/or along an axis, etc. to provide different alternative positions.

Figure 4:
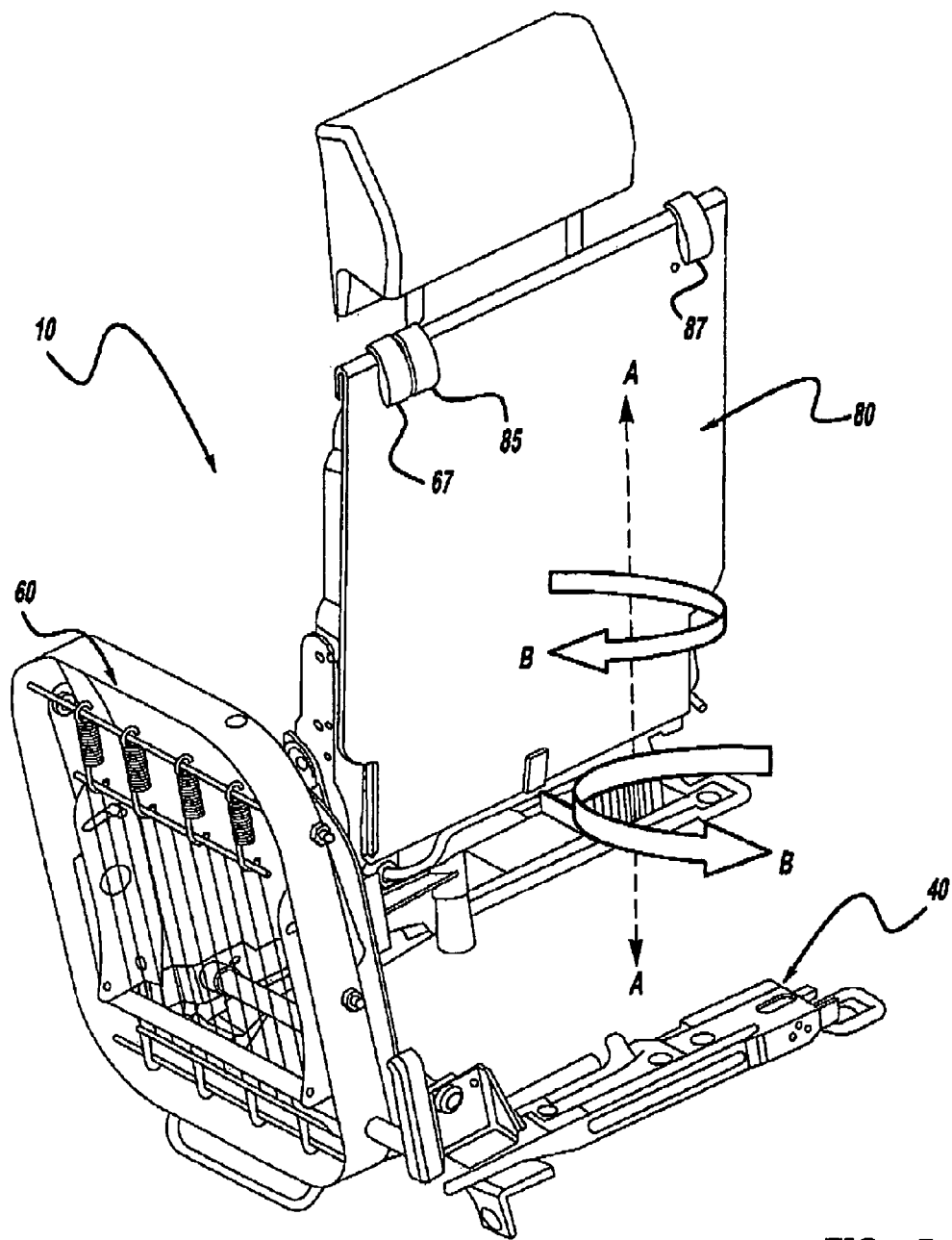
FIG. 4 is a perspective view of the seat assembly of FIG. 1B shown with a seat bottom and seat back in the stowed position, in accordance with one embodiment of the present invention.

After the seat bottom 60 has been stowed, the seat back 80 may be repositioned between the seated position, shown in FIG. 2, and the stowed position, which is shown in FIG. 4. Seat back 80 rotates about the longitudinal axis A as denoted by arrows B during repositioning between the seating and stowed positions. The seated positions of the seat bottom 60 and seat back 80 are defined herein as the conformation of the seat assembly 10 that allows passenger(s) to be seated thereupon. The stowed positions of the seat bottom 60 and seat back 80 are defined herein as the conformation of the seat assembly 10 that facilitates ingress and egress of passenger (s), cargo, and the like into and out of the vehicle 20.

Figure 6:
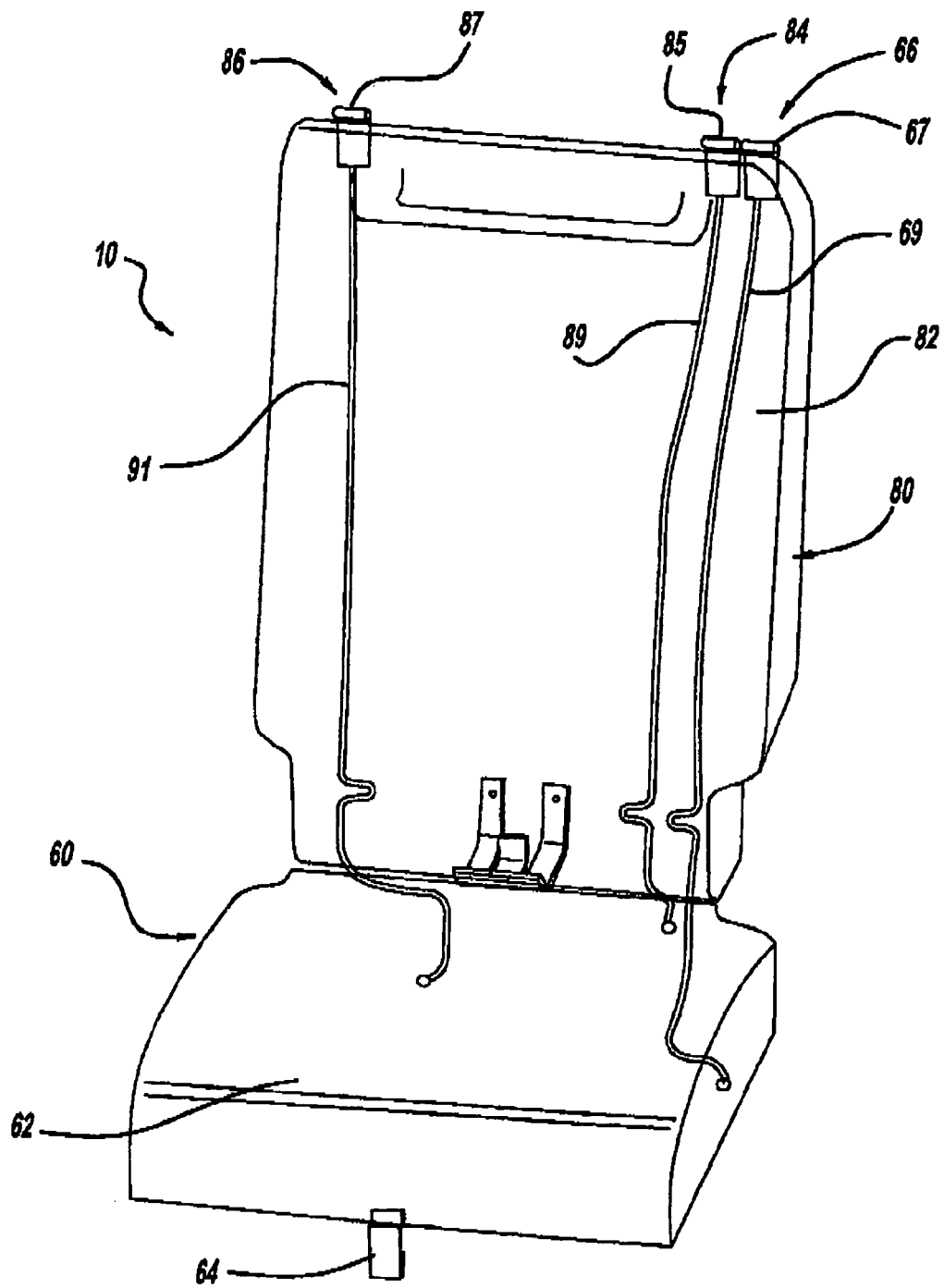
FIG. 6 is a perspective view of a portion of the seat assembly including padding positioned on the seat bottom and seat back, wherein a plurality of releases are coupled to cables are shown, and shown in accordance with one embodiment the present invention.

As shown in FIG. 6, the seat back 80 may include a seated position seat bottom release 65, a seated position seat back release 84, and a stowed position seat back release 86. Releases 66, 84 and 86 may comprise loops of fabric 67, 85 and 87 operably attached to cables 69, 89 and 91, which release respective assemblies of the seat assembly 10.

Figure 7:
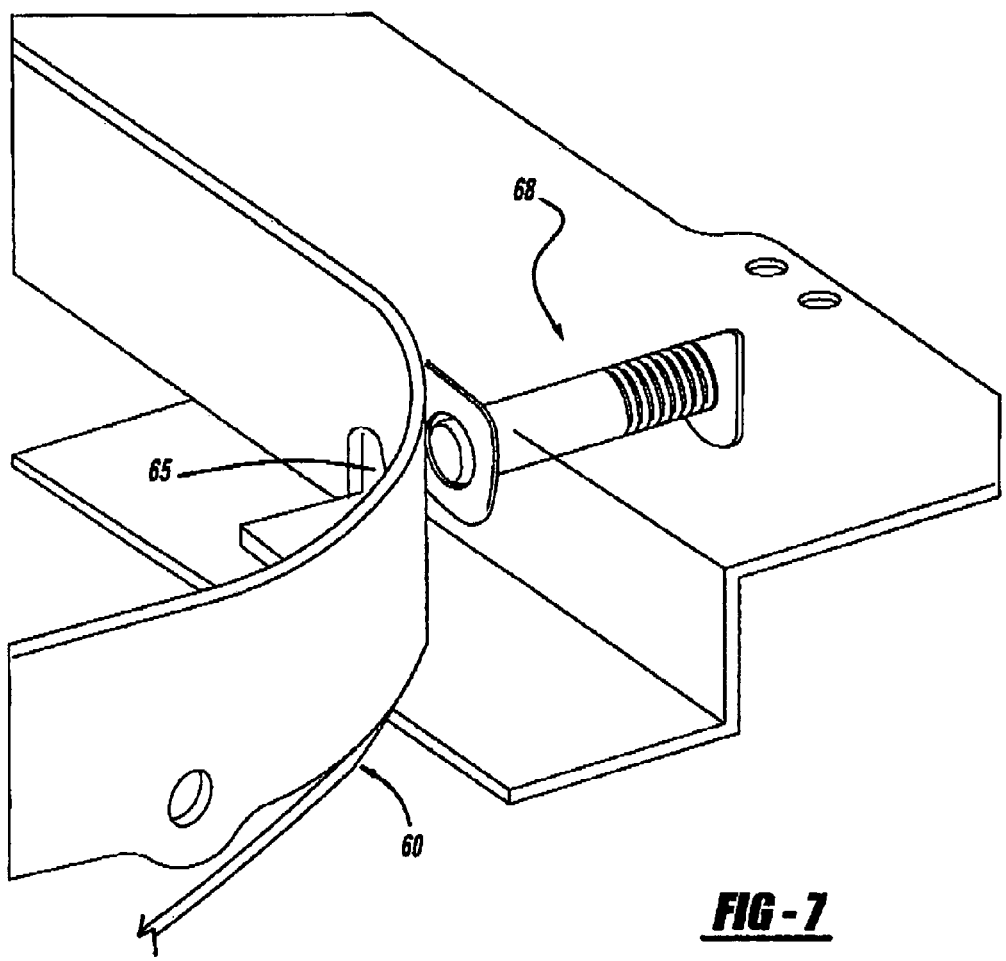
FIG. 7 is a detailed perspective view of a seat bottom lock assembly of the seat bottom shown in accordance with one embodiment of the present invention.

Referring now to FIG. 7, a seat bottom lock assembly of the seat bottom 60 is shown in accordance with one embodiment of the present invention. Seat bottom 60 may include a bracket spring assembly 68, which biases a lock pin into the seat frame 65. Seated position seat bottom release 66 may be operably attached to and releases the bracket spring assembly 68.

Figure 8:
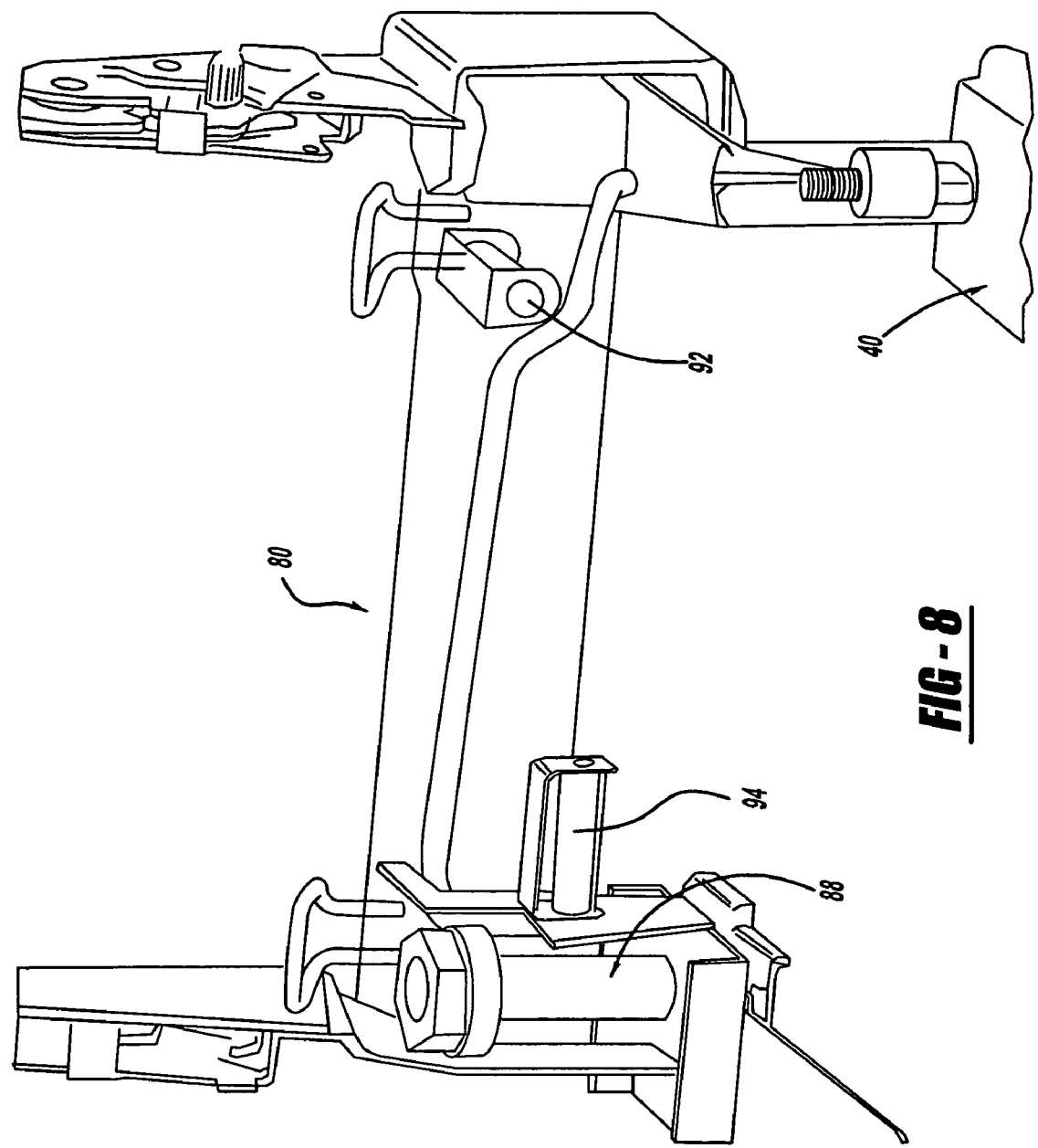
FIG. 8 is a detailed perspective view of two seat back assemblies of the seat back, shown in accordance with one embodiment of the present invention.

Referring now to FIG. 8, two seat back assemblies of the seat back 80 are shown in accordance with one embodiment of the present invention. Seat back 80 may be operably attached to the frame 40 with a rotating assembly 88, which bias the seat back 80 and provides rotation about the longitudinal axis. Seated position seat back release 84 may be operably attached to a first seat back lock assembly 92. Stowed position seat back release 86 may be operably attached to a second seat back lock assembly 94. First seat back lock assembly 92 and the second seat back lock assembly 94 lock the seat back 80 in the seated and stowed positions, respectively.

During reposition of the seat assembly 10 from the seating position to the stowed position, the seated position seat bottom release 66 may be activated to allow repositioning of the seat bottom 60 to the stowed position. After repositioning of the seat bottom 60, the seated position seat back release 84 may be activated to allow repositioning of the seat back 80 to the stowed position. Releases 66, 84 may use the cables 69, 81 to withdraw spring loaded pins of the bracket spring assembly 68 and the first seat back lock assembly 92 to the seat bottom 60 and seat back 80, respectively. Once the seat assembly 10 is positioned fully to the stowed position, cargo, passengers, and the like may be free to access and exit the vehicle 20.

To reposition the seat assembly 10 to the seating position, the stowed position seat back release 86 may be activated to allow repositioning of the seat back 80 to the seating position. The seat bottom 60 may then be manually repositioned to the seating position. Those skilled in the art will recognize that the order and mechanisms of repositioning may vary without departing from the spirit and scope of the present invention.

Figure 5:
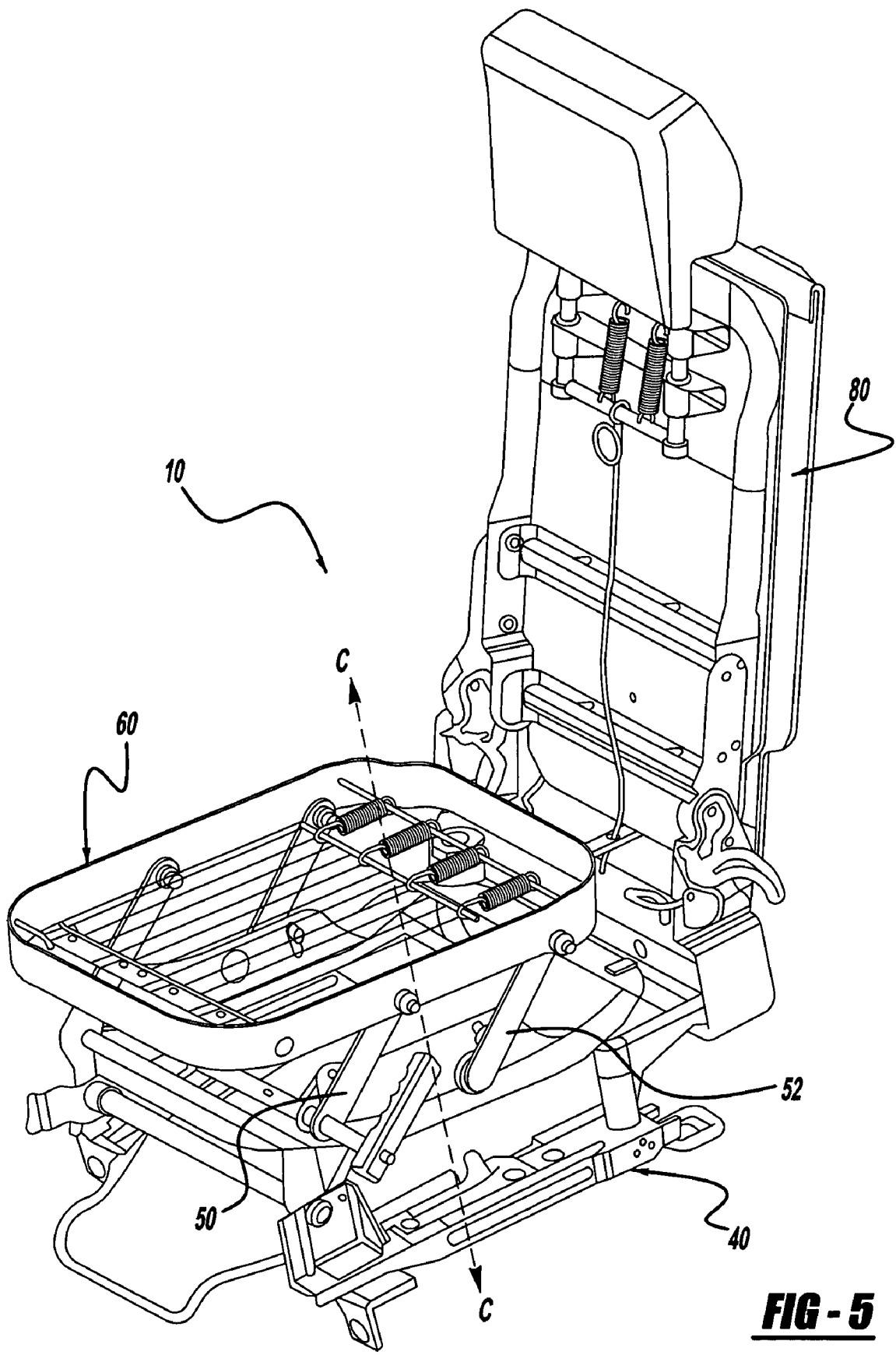
FIG. 5 is a perspective view of the seat assembly shown in FIG. 2 shown with a seat bottom in an elevated position, and the seat back in the seated position, in accordance with one embodiment of the present invention.

Seat bottom 60 may also be repositioned between the seated position, shown in FIG. 2, and an elevated position, which is shown in FIG. 5. The elevated position of the seat bottom 60 is defined herein as the conformation of the seat assembly 10 that allows a passenger to be seated thereupon at an elevated height (i.e., a "booster" height). Seat bottom 60 may be operably attached to the frame 40 with at least one, in this case two, pivoting links 50 and at least one, in this case two, sliding links 52. Sliding links 52 provide repositioning of the seat bottom 60 between the seating position and the elevated position substantially along a vertical axis C. A sliding motion of the sliding links 52 allows the distance between the seat bottom 60 and the seat back 80 to remain substantially constant during repositioning of the seat bottom 60.

It should be noted that the seat assembly 10 shown in FIGS. 2-5 are shown without seat padding to more clearly illustrate seat assembly 10 and its repositioning. Seat pads 62, 82 as shown in FIG. 6 on the seat bottom 60 and the seat back 80, respectively. A relatively small gap may be maintained between the seats pads 62, 82 of the seat bottom 60 and the seat back 80 during repositioning of the seat bottom 60 minimizing the size of objects that would otherwise fall there between. Alternatively, the seats pads 62, 82 may be in contact one to another throughout the repositioning of the seat bottom 60. A flange portion 64, in this case a loop of fabric, is operably attached to the seat bottom 60 for assisting its repositioning.

Figure 9:
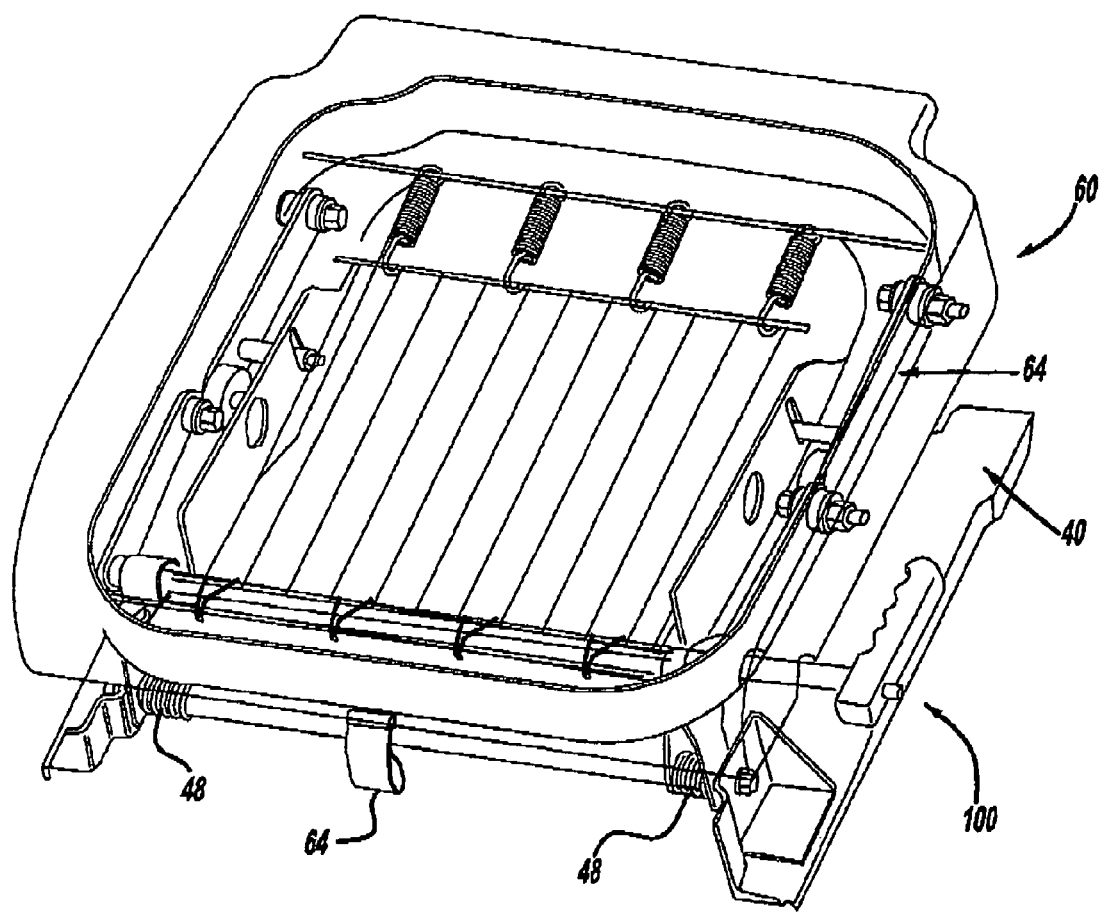
FIG. 9 is a detailed perspective view of the handle assembly and seat bottom shown in accordance with one embodiment of the present invention.

Referring now to FIG. 9, a handle assembly 100 is shown in accordance with one embodiment of the present invention. Handle assembly 100 may be operably attached to the frame 40 and the seat bottom 60, specifically at a seat frame 65. Frame 40 includes at least one, in this case two, springs 45 for biasing the seat bottom 60 from the seated positions, as shown, to the stowed position.

Figure 10:
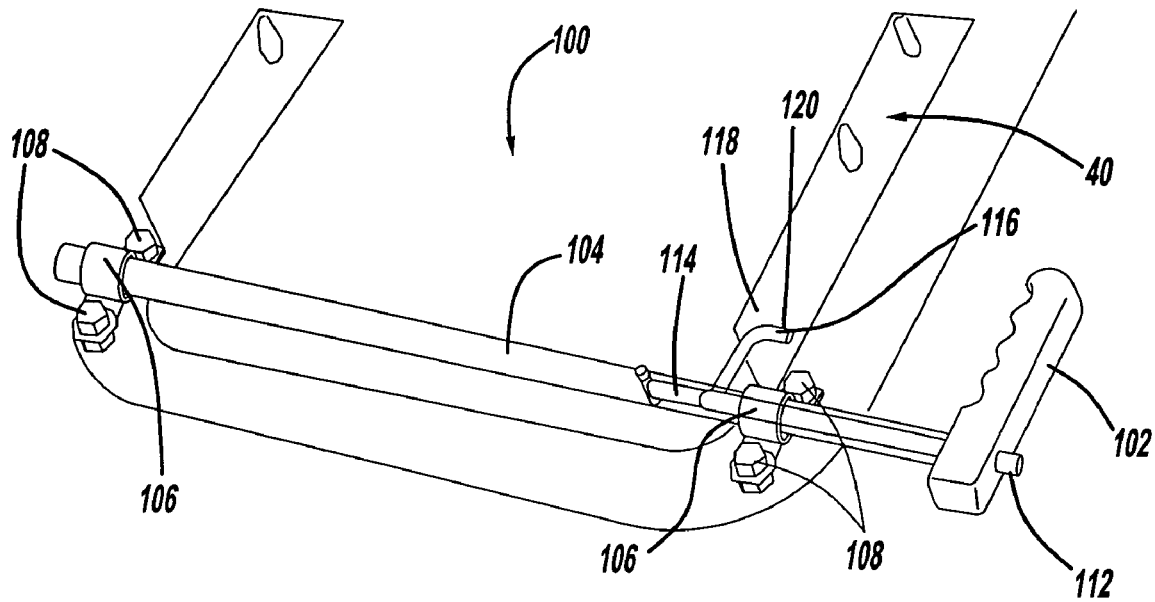
FIG. 10 is a detailed perspective view of a portion of the handle assembly shown in FIG. 9 shown in accordance with one embodiment of the present invention.

Referring now to FIG. 10, a portion of a handle assembly 100 is shown in accordance with one embodiment of the present invention. Handle assembly 100 facilitates repositioning of the seat bottom 60 from the seated position to the elevated position. In addition, the handle assembly 100 provides means for locking and unlocking of the seat bottom 60 when positioned at the seated and elevated positions. Handle assembly 100 may include a handle portion 102 operably attached to a bar portion 104. Bar portion 104 may be operably attached to the frame 40 with two brackets 106, each including two nut and bolt attachments 108. Handle assembly 100 may include a locking and unlocking assembly 110 including a plunger 112, spring 114, and lock portion 116. Locking and unlocking assembly 110, except for the lock portion 116, may be positioned substantially coaxially and within with the bar portion 104. Spring 114 biases the lock portion 116 into engagement with a hole 118, 120 formed in the frame 40 to lock the handle assembly 100.

Figure 11:
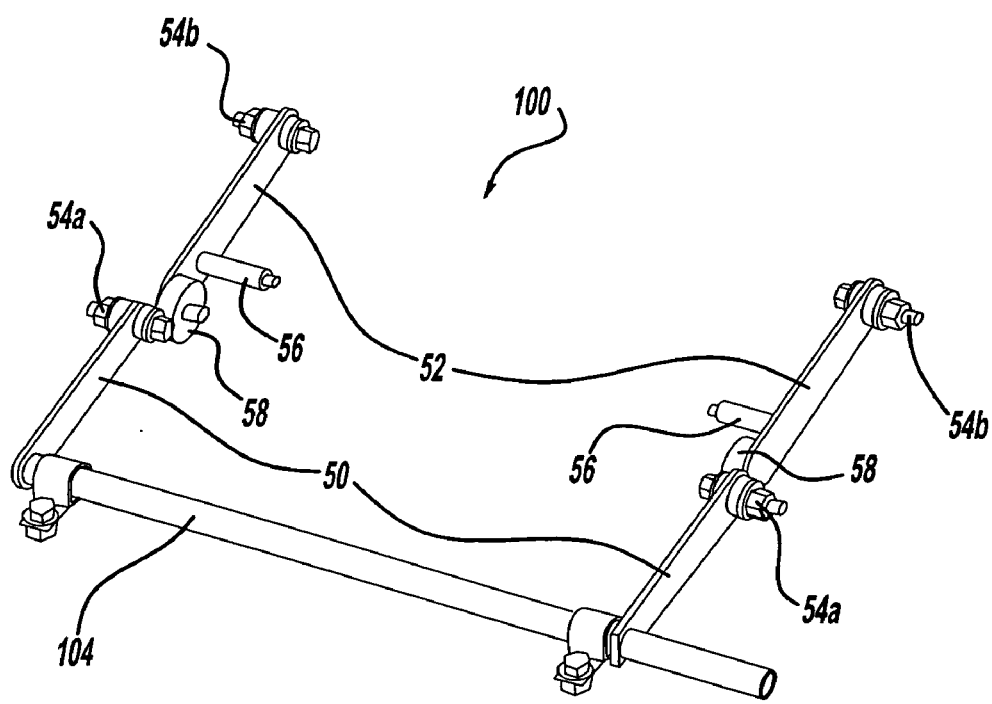
FIG. 11 is another detailed perspective view of a portion of the handle assembly shown in FIG. 9 shown in accordance with one embodiment of the present invention.

Referring now to FIG. 11, a portion of a handle assembly 100 is shown in accordance with one embodiment of the present invention. Handle assembly 100 further includes the pivoting links 50 and sliding links 52. Pivoting links 50 may be operably attached with welds to the bar portion 104 at a first end. Pivoting links 50 may be operably attached to the seat bottom 60 at a second end with rotating bolt attachments 54a. Sliding links 52 may be operably attached to the frame 40 with rotating pins 56 and include rotating wheels 58 for providing the sliding motion of the seat bottom 60. Sliding links 52 may be operably attached to the seat bottom 60 at a second end with rotating bolt attachments 54b.

Referring now to FIGS. 5 and 8-10, during repositioning of the seat bottom 60, the plunger 112 is biased inward, typically with a thumb, thereby compressing the spring 114 and disengaging the lock portion 116 from the appropriate hole 118, 120. Handle assembly 100 is free to rotate, typically with a hand at the handle portion 102, thereby allowing repositioning of the seat bottom 60 between the seating position and the elevated position. As the seat bottom 60 is repositioned, the pivoting link 50 swings about a simple radius and the sliding link 52 swing about a compound arc, thereby allowing the seat bottom 60 to elevate substantially along the vertical axis C.

Figure 12:
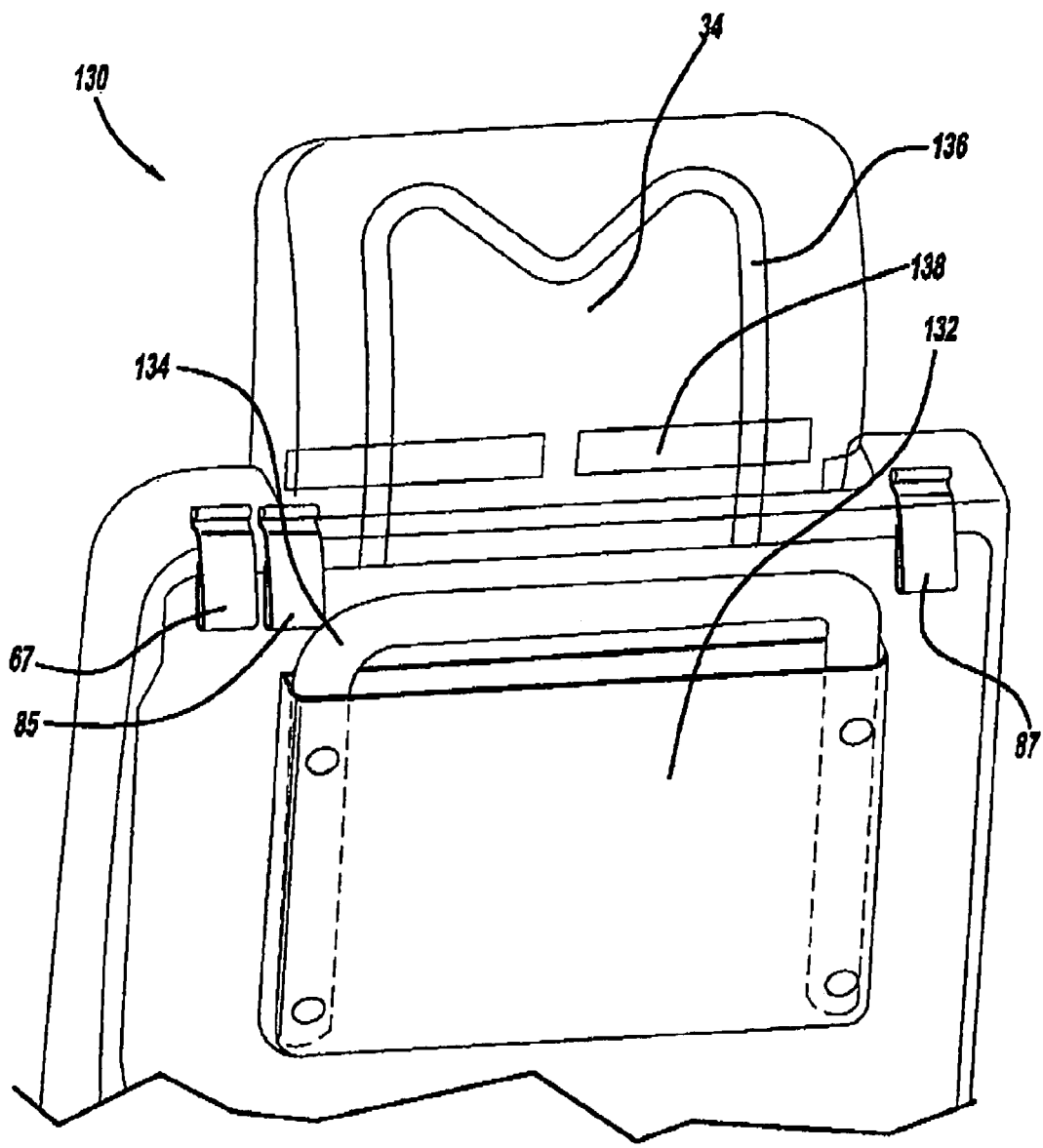
FIG. 12 is a detailed perspective view of a portion of the seat back assembly including a grab handle and a storage bin, shown in accordance with one embodiment of the present invention.

Referring now to FIG. 12, a portion of the seat back assembly 130 is shown in accordance with one embodiment of the present invention. Seat back assembly 130 may include at least one, in this case one, storage bin 132 and at least one, in this case one, grab handle 134 operably attached thereto. Storage bin 132 may be adapted to hold items and grab handle 134 may be adapted to assist ingress and egress from the vehicle 20. Seat back assembly 130 may include an adjustable headrest 34, which may be adjusted in vertical and horizontal directions. This may be achieved by semi-rigid members 136, 138 inserted within the headrest 34.

While the embodiments of the invention disclosed herein are presently considered to be preferred, various changes and modifications can be made without departing from the spirit and scope of the invention. For example, the seat assembly configuration, and method of repositioning the same are not limited to any particular design or sequence. Specifically, the frame, seat bottom, seat back, materials, features, attachments, and method of repositioning may vary without limiting the utility of the invention.

Upon reading the specification and reviewing the drawings hereof, it will become immediately obvious to those skilled in the art that myriad other embodiments of the present invention are possible, and that such embodiments are contemplated and fall within the scope of the presently claimed invention. The scope of the invention is indicated in the appended claims, and all changes that come within the meaning and range of equivalents are intended to be embraced therein.

The invention claimed is:

1. A seat assembly for a vehicle, the assembly comprising:
   a frame operably attached to the vehicle;
   a seat bottom operably attached to the frame, the seat bottom repositionable between a seating position and a stowed position; and
   a seat back operably attached to the frame, the seat back repositionable between a seating position and a stowed position; wherein the seat back rotates about a longitudinal axis during repositioning of the seat back between the seating position and the stowed position, the seat back including a first cable adjacent to a top of the seat back and coupled to a release to enable the seat back to be repositioned from the seating position to the stowed position, and the seat back including a second cable adjacent to the too of the seat back and coupled to a second release to enable the seat back to be repositioned from the stowed position to the seating position.

2. The seat assembly of claim 1 wherein the seat bottom is operably attached to the frame with at least one hinge assembly.

3. The seat assembly of claim 1 wherein the seat back is operably attached to the frame with at least one rotating assembly for providing the seat back rotation about the longitudinal axis.

4. The seat assembly of claim 1 wherein the seat back is repositioned from the seating position to the stowed position after the seat bottom is repositioned from the seating position to the stowed position.

5. The seat assembly of claim 1 wherein the seat bottom is repositioned between the seating position and an elevated position substantially along a vertical axis.

6. The seat assembly of claim 1 further comprising at least one biasing assembly operably attached to at least one of the seat bottom and the seat back.

7. The seat assembly of claim 1 further comprising:
   at least one locking assembly operably attached to at least one of the seat bottom and the seat back; and
   at least one latch assembly operably attached to the at least one locking assembly.

8. The seat assembly of claim 1 further comprising a grab handle means operably attached to the seat back.

9. The seat assembly of claim 1, wherein a fabric loop is coupled to the first and second cables to facilitate pulling the cables to release the seat back assembly.

10. The seat assembly of claim 1, wherein the seat back includes a third cable adjacent to a top of the seat back and coupled to a third release to enable the seat bottom to be repositioned between the seating position to the stowed position.

11. A method of operating a seat assembly far a vehicle, the method comprising:
   pulling a seat bottom cable adjacent to a top of a seat back to pull a seat bottom pin to release a seat bottom;
   repositioning the seat bottom between a seating position and a stowed position;
   pulling a seat back cable adjacent to the top of the seat back to pull a seat back pin to release the seat back from a seating position; and
   repositioning the seat back between the seating position and a stowed position about a longitudinal axis.

12. The method of claim 11 wherein the seat back is repositioned from the seating position to the stowed position after the seat bottom is repositioned from the seating position to the stowed position.

13. The method of claim 11 wherein the seat bottom is repositioned between the seating position and an elevated position substantially along a vertical axis.

14. The method of claim 11 further comprising biasing at least one of the seat bottom and the seat back.

15. The method of claim 11 further comprising:
   locking at least one of the seat bottom and the seat back; and
   releasing at least one of the locked seat bottom and the locked seat back.

16. The method of claim 11, further comprising:
   pulling another seat back cable adjacent to the top of the seat back to pull a stowed seat back pin to release the seat back from the stowed position; and
   repositioning the seat back between the stowed position and the seating position about the longitudinal axis.

* * * * *